United States Patent [19]

Chang et al.

[11] 4,093,673

[45] June 6, 1978

[54] COATING COMPOSITIONS COMPOSED OF HYDROXYFUNCTIONAL POLYMERS OR COPOLYMERS AND ALKOXYSILANES

[75] Inventors: Wen-Hsuan Chang; Rostyslaw Dowbenko, both of Gibsonia; Marvis E. Hartman, Pittsburgh; Samuel Porter, Jr., Tarentum, all of Pa.

[73] Assignee: PPG Industries, Inc., Pittsburgh, Pa.

[21] Appl. No.: 523,781

[22] Filed: Nov. 14, 1974

[51] Int. Cl.² .................... C08L 43/04; C08L 67/02; C08L 75/06; C08L 75/08
[52] U.S. Cl. .................... 260/824 EP; 260/824 R; 260/826; 260/827
[58] Field of Search ............. 260/824 R, 826, 824 EP, 260/827

[56] References Cited

U.S. PATENT DOCUMENTS

| | | | |
|---|---|---|---|
| 2,500,842 | 3/1950 | MacKenzie et al. | 260/826 X |
| 2,634,285 | 4/1953 | Rust et al. | 260/824 R |
| 2,686,739 | 8/1954 | Kohl | 260/824 R |
| 2,687,396 | 8/1954 | McLean | 260/826 X |
| 3,150,116 | 9/1964 | Masters | 260/826 X |
| 3,217,065 | 11/1965 | Higashi | 260/826 |
| 3,309,261 | 3/1967 | Schiller et al. | 260/824 R |
| 3,317,369 | 5/1967 | Clark et al. | 260/824 R |
| 3,436,252 | 4/1969 | Neuroth | 260/827 X |
| 3,450,791 | 6/1969 | Sekmakas et al. | 260/826 |
| 3,455,877 | 7/1969 | Plueddemann | 260/824 EP |
| 3,468,836 | 9/1969 | Sekmakas | 260/826 X |
| 3,644,245 | 2/1972 | Flanagan et al. | 260/824 R |
| 3,706,697 | 12/1972 | Backderf | 260/827 X |

FOREIGN PATENT DOCUMENTS

70/34707  11/1970  Japan ........................... 260/824 EP

*Primary Examiner*—Sandra M. Person
*Attorney, Agent, or Firm*—Charles R. Wilson; Frank J. Troy

[57] ABSTRACT

Resinous compositions useful as coating compositions comprise blends of hydroxyfunctional polymers; organoalkoxy silane crosslinking agents represented by the formula:

$$R_nSi(OR')_{4-n}$$

wherein R is an aryl, alkaryl, aralkyl, alkyl having 1 to 8 carbon atoms, $$XR_4—$$

or

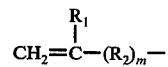

radical, wherein $R_1$ is hydrogen or an alkyl radical of 1 to 6 carbon atoms, $R_2$ is a member selected from the group consisting of alkylene radicals of 1 to 7 carbon atoms and carbonyloxy radicals represented by the formula:

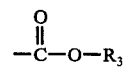

wherein $R_3$ is an alkylene radical of 1 to 6 carbon atoms, wherein $R_4$ is an alkylene radical of 1 to 6 carbon atoms, a cycloalkylene radical, or an arylene radical and X is a functional group selected from the group consisting of —OH, —SH,

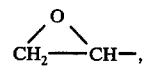

halogen, NH₂—,

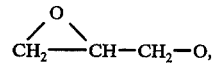

and NH₂—CH₂—CH₂—NH—, and wherein R' is methyl, ethyl, 2-methoxyethoxy, 2-ethoxyethoxy, m is 0 or 1 and n is 0, 1 or 2; and cure accelerating catalysts. Hydroxyfunctional polymers such as hydroxyfunctional acrylic polymers, polyesters and polyurethanes are particularly useful. Organic acids, metallic salts of organic acids and organic bases are useful cure accelerating catalysts.

35 Claims, No Drawings

COATING COMPOSITIONS COMPOSED OF HYDROXYFUNCTIONAL POLYMERS OR COPOLYMERS AND ALKOXYSILANES

BACKGROUND OF THE INVENTION

This invention relates to resinous coating compositions comprising blends of hydroxyfunctional polymers or copolymers, alkoxysilane crosslinking agents and cure accelerating catalysts.

Organo-silicon compounds such as polyorganosiloxanes, polysilanols and organoalkoxysilanes have previously been utilized in prior art resinous coating compositions to provide films having superior durability, e.g., see U.S. Pat. Nos. 3,318,971, 3,468,836, 3,644,566, 3,668,272, 3,707,518, 3,707,709 and 3,816,164. However, in the prior art resinous coating compositions as exemplified by the above patents such organo-silicon compounds were incorporated into the resin polymer by polymerizing the organo-silicon compound with the resin monomer to produce a silicon-containing copolymer or interpolymer. In another method exemplified in the above patents i.e., U.S. Pat. No. 3,318,971 and 3,468,836, the organo-silicon compound is incorporated into the resin by partially condensing a hydroxyfunctional acrylic polymer with a silicon containing material such as a polysilanol or a polyorganosiloxane to form a single phase or unitary resin. In any event, the above-mentioned prior art patents teach resinous coating compositions in which the organo-silicon compound is incorporated into or chemically bonded to the resin polymer. These patents do not teach or suggest resinous coating compositions in which a resinous polymer is physically blended with an organo-silicon compound and in fact teach that the physical blending of an organosilicon compound with a resin polymer is undesirable. Thus, U.S. Pat. Nos. 3,318,971 and 3,668,272 teach that the physical blending of silicon-containing resins with commercially available acrylic resins was without significant benefit or success and that small proportions of silicon-containing resins used in such blends accomplished little while larger proportions of silicon-containing resins degraded the cure of the acrylic resins and films produced from such blends were brittle and of limited utility. The necessity of incorporating the organo-silicon compound into the resin polymer by polymerization or condensation to form a useful coating composition which when crosslinked by curing produces a film exhibiting good physical properties presents obvious disadvantages. Thus, polymerization reactions often require extensive equipment and control procedures while in condensation reactions an intermediate is often formed which requires an additional processing step before the intermediate can be incorporated into the resin polymer. Moreover, as indicated previously, in several of the prior art coating compositions exemplified in the above patents an additional crosslinking agent such as an aminoplast resin is employed to provide a highly crosslinked film having good physical properties.

Accordingly, it would be highly advantageous if a resinous coating composition containing an organo-silicon compound could be formulated by physically blending or admixing the resin polymer with the organo-silicon compound at ambient temperature in conventional mixing equipment to produce a silicon-containing resinous coating composition which would not require an additional crosslinking agent and yet which upon curing produces a film having good physical properties. The coating compositions of this invention possess this capability.

DESCRIPTION OF THE PREFERRED EMBODIMENTS

Referring first to the hydroxyfunctional polymer component of the compositions of this invention, a wide variety of hydroxyfunctional polymers may be utilized. Thus, hydroxyfunctional polymers such as hydroxyfunctional acrylic polymers, hydroxyfunctional polyesters and hydroxyfunctional polyurethanes may suitably be employed. The term "polymer" as employed throughout this specification and claims is defined herein to include not only homopolymers but also copolymers, terpolymers, tetrapolymers and the like.

Hydroxyfunctional acrylic polymers which may suitably be employed in the coating compositions of this invention are known in the art. These polymers are prepared by copolymerizing an hydroxy-containing monomer with at least one other monomer containing the $CH_2=C<$ group. The preferred hydroxy-containing monomers are the hydroxy alkyl esters of acrylic or methacrylic acid, such as, for example, 2-hydroxyethyl acrylate, 2-hydroxyethyl methacrylate, 3-hydroxypropyl methacrylate, 4-hydroxybutyl methacrylate and glycerol allyl ether. A preferred hydroxy-containing monomer of the above type is 2-hydroxyethyl acrylate. Still further hydroxy-containing monomers which may be used are ethylene glycol allyl ether, propylene glycol allyl ether, butylene glycol allyl ether, diethylene glycol allyl ether, trimethylol propane allyl ether and 2-hydroxymethyl-5 norbornene (either the endo isomer or the exo isomer or mixtures thereof). From the standpoint of proportion, the copolymers should contain from about 3 to about 30 percent, preferably from about 5 to about 15 percent of the hydroxy-containing component based on copolymer weight.

As indicated, the hydroxyfunctional acrylic polymer component of this invention is prepared by copolymerizing the above-described hydroxyl-containing monomer with at last one other monomer containing the $CH_2=C<$ group. In practice, it is preferred to copolymerize the hydroxyl-containing monomer with a combination of ethylenically-unsaturated monomers to produce desirable properties in the film-forming coating composition. Typical ethylenically-unsaturated monomers which may be used in film-forming acrylic copolymers are well known in the coating art. It is preferred in accordance with this invention to use combinations of monomers which form hard polymers, such as styrene, vinyl toluene, and alkyl methacrylates having from 1 to 4 carbon atoms in the alkyl group, as illustrated by methyl methacrylate and butyl methacrylate with monomers which form soft polymers, such as alkyl or substituted alkyl esters of acrylic acid or methacrylic acid, the alkyl groups having from 1 to 13 carbon atoms in the case of acrylic esters and 5 to 16 carbon atoms in the case of methacrylic esters. Illustrative of these latter monomers are ethyl acrylate, butyl acrylate, 2-ethylhexyl acrylate, 2-ethylhexyl methacrylate, decyl methacrylate and lauryl methacrylate. Other monomers which may be included are illustrated by vinyl chloride, vinyl acetate, acrylonitrile, and the like.

In addition to the foregoing monomers, the hydroxyfunctional acrylic polymer may advantageously contain carboxyl group-containing monomers such as acrylic acid, methacrylic acid, crotonic acid, monobutyl maleate, maleic acid, and the like. The preferred carboxyl group-containing monomers are acrylic acid and methacrylic acid. Ordinarily only minor proportions (i.e., from 1 to 7 percent by weight of polymer) of such carboxyl group-containing monomers are included in the polymer.

The hydroxyfunctional acrylic polymers utilized in the compositions of this invention may be prepared in well known manner by copolymerizing the monomers in an organic liquid which is a solvent for the monomers and the polymer which is formed with the polymerization being effected in the presence of a free radical generating polymerization catalyst, elevated temperatures being normally used to speed the reaction.

Chain terminating agents, such as mercaptans, may be used to exert their known effect of lowered average molecular weight.

A wide variety of well-known free radical generating polymerization catalysts may be used, such as, for example, the usual persulfate or peroxide systems illustrated by potassium persulfate and cumene hydroperoxide and the azo compounds illustrated by alpha, alpha'-azobis(isobutyronitrile). Other useful catalysts include tertiary-butyl perbenzoate, tertiary butyl pivalate, isopropyl percarbonate and similar compounds. The preferred catalysts are the azo compounds.

A variety of organic solvents may be used in the polymerization process. Butanol, preferably in admixture with xylene, is a preferred solvent system, but other solvents such as toluene, methyl ethyl ketone, methyl isobutyl ketone, acetone, butyl acetate, 2-ethoxy ethanol, 2-butoxy ethanol and the like may be useful.

For a more detailed description of the above-described hydroxy functional acrylic polymers and their method of preparation, see U.S. Pat. No. 3,262,919, incorporated herein by reference.

Hydroxyfunctional polyester polymers or more simply polyester polyols and their method of preparation are well-known in the art. A wide variety of such polyester polyols may be used in the compositions of this invention. Polyester polyols are prepared by reacting a polyol in excess with a polycarboxylic acid or acid anhydride in well-known manner. A preferred polyester polyol employed in the compositions of this invention is prepared by reacting a polyol component having an average functionality of at least about 1.9 and an acid component consisting essentially of one or more monomeric carboxylic acids or anhydrides containing 2 to 14 carbon atoms and also having an average functionality of at least about 1.9. By the term "functionality" is meant the number of reactive hydroxyl and carboxyl groups per molecule, with anhydride groups being considered as equivalent to two carboxyl groups.

The polyol component of the preferred polyester polyol ordinarily consists of one or more diols but compounds having 3 or more hydroxyl groups may also be present in the combination with the diols. In any event, the polyol component should contain not more than 25 mole percent of compounds having 3 or more hydroxyl groups. There may also be present a small amount of a monoalcohol, particularly if larger proportions of higher polyols are used. In certain instances, such as where very high molecular weight polyols are used, the polyols can be largely or even entirely made up of compounds of functionality higher than two.

The diols which are usually employed in making the polyester include alkylene glycols, such as ethylene glycol, propylene glycol, butylene glycol, hexylene glycol, and neopentyl glycol, and other glycols such as hydrogenated bisphenol A, cyclohexane dimethanol, caprolactone diol (e.g., the reaction product of caprolactone and ethylene glycol), hydroxyalkylated bisphenols, polyether glycols, e.g., poly(oxytetramethylene) glycol and the like. However, other diols of various types and, as indicated, polyols of higher functionality can also be utilized. Such higher polyols can include, for example, trimethylolpropane, trimethylolethane, pentaerythritol, caprolactone triol (e.g., the reaction product of caprolactone and trimethylolpropane), and the like, as well as higher molecular weight polyols such as those produced by oxyalkylating low molecular weight polyols. An example of such higher molecular weight polyol is the reaction product of 20 moles of ethylene oxide per mole of trimethylolpropane.

The acid component of the polyester consists primarily of monomeric carboxylic acids or anhydrides having 2 to 14 carbon atoms per molecule. The acids should have an average functionality of at least about 1.9; the acid component in most instances contains at least about 75 mole percent of dicarboxylic acids or anhydrides.

Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. The polyester may include minor amounts of monobasic acid, such as benzoic acid, and there also can be employed higher polycarboxylic acids, such as trimellitic acid and tricarballylic acid (where acids are referred to above, it is understood that the anhydrides of those acids which form anhydrides can be used in place of the acid.) It is preferred that the polyester include an aliphatic dicarboxylic acid as at least part of the acid component. Also useful are such materials as lactones, tartaric acid, and the like.

The polyester is produced using conventional techniques, with the reaction conditions and the ratio of reactants chosen so as to provide a product having residual hydroxyl groups, i.e., a polyester polyol. The number of hydroxyls present in the product can be varied, but it is preferred that its hydroxyl value be at least about 20 and preferably more than about 50.

Hydroxyfunctional polyurethanes or, more simply, polyurethane polyols, and their method of preparation are also well-known in the art. A wide variety of such polyurethanes may be used in the compositions of this invention. These polyurethane polyols are prepared by reacting a polyol component in excess with a polyisocyanate.

The polyol component may be a polyester polyol or polyether polyol or a mixture thereof. Polyester polyols which may be employed in preparing the polyurethane polyol used in the compositions of this invention are the polyester polyols described above.

Polyether polyols useful herein may be prepared by reacting a polyol component in excess with an alkylene oxide in known manner. For example, useful polyether polyols may be prepared by reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides, such as ethylene oxide, propylene oxide, butylene oxide, their mixtures, and the like.

Preferred polyether polyols which may be employed herein include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof.

The polyisocyanate which is reacted with the above-described polyols can be essentially any organic polyisocyanate, e.g., hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene bis(phenylisocyanate), lysine methyl ester diisocyanate, bis(isocyanatoethyl)fumarate, isophorone diisocyanate and methyl cyclohexyl diisocyanate. There can also be employed isocyanate-terminated adducts of diols, such as ethylene glycol, 1,4-butylene glycol, polyalkylene glycols, etc. These are formed by reacting more than one mole of a diisocyanate, such as those mentioned with one mole of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples, include bis(isocyanatocyclohexyl)methane, 1,4-butylene diisocyanate, isophorone diisocyanate, and methyl cyclohexyl diisocyanate.

The conditions of the reaction between the polyol and the polyisocyanate are chosen so as to produce an ungelled hydroxyl-containing urethane reaction product. This can be accomplished by utilizing an equivalent ratio of isocyanate groups n the polyisocyanate to hydroxyl groups in the polyol of less than 1.0, and preferably 0.93 or less, and allowing substantially all of the isocyanate groups present to react.

A preferred polyurethane polyol which may be utilized in the compositions of this invention is the ungelled reaction product of a polyurethane polyol containing at least 0.075 percent by weight of acidic carboxyl groups and an alkylenimine or substituted alkylenimine. The preferred alkylenimines are imines of the structure:

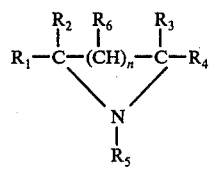

wherein $R_1$, $R_2$, $R_3$, $R_4$, and $R_5$ are each hydrogen; alkyl such as methyl, ethyl, propyl, or the like, having for example up to about 20 carbon atoms; aryl, such as phenyl or the like; alkaryl, such as tolyl, xylyl or the like; or aralkyl such as benzyl phenethyl, or the like. $R_6$ in the above formula is hydrogen or a lower alkyl radical, usually having not more than 6 carbon atoms, and n is an integer from 0 to 1. The preferred polyurethane polyols of the above type and their method of preparation are described in U.S. Pat. No. 3,917,570.

As discussed above, the compositions of this invention in addition to the hydroxyfunctional polymer contain an organoalkoxysilane crosslinking agent.

The term "crosslinking agent" as employed through the specification and claims refers to compounds which are capable of effecting crosslinking of the hydroxyfunctional polymer at desired curing temperatures (e.g., 200° F. to 400° F.). Crosslinking agents which may suitably be employed in the present compositions are monomeric organoalkoxysilane compounds represented by the formula $R_nSi(OR')_{4-n}$ wherein R may be an aryl radical such as phenyl, biphenyl, naphthyl and the like; an alkaryl radical such as tolyl, xylyl, ethylphenyl and the like; an aralkyl radical such as benzyl, phenylethyl and the like; an alkyl radical having from 1 to about 8 carbon atoms such as methyl, ethyl, propyl, butyl, hexyl, and the like; a radical represented by the formula

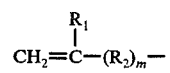

wherein $R_1$ is hydrogen or an alkyl radical of 1 to 6 carbon atoms, $R_2$ is a member selected from the group consisting of alkylene radicals of 1 to 7 carbon atoms and carbonyloxy radicals represented by the formula

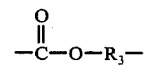

wherein $R_3$ is an alkylene radical of 1 to 6 carbon atoms and m is 0 or 1; or an $XR_4$— radical, wherein $R_4$ is an alkylene radical of 1 to 6 carbon atoms with the ethylene, propylene, and butylene radicals being preferred, a cycloalkylene radical such as cyclohexyl, cyclopropyl, and the like, and X represents a functional group such as —OH, —SH,

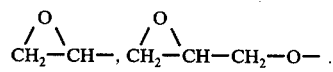

$NH_2CH_2CH_2HN-$, $NH_2-$, halogen or the like. In the formula, R' is methyl, ethyl, 2-methoxyethoxy, 2-ethoxyethoxy and n is 0, 1 or 2.

Illustrative of compounds in which R is the radical represented by the formula

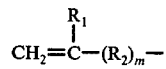

and $R_2$ is a carbonyloxy radical as described above, and m and n are both 1 and R' is methyl or ethyl are compounds such as gamma-methacryloxypropyltrimethoxysilane, gamma-methacryloxypropyltriethoxysilane and the like. In the above formula, when m is 0, the radical may be a vinyl, allyl or like radical. Illustrative of such compounds are vinyltrimethoxysilane, vinyltriethoxysilane, and the like.

The radical $XR_4$— may be illustrated by gamma-aminopropyl, gamma-chloropropyl and the like. Preferred compounds of this type are β-(3,4-epoxycyclohexyl)ethyltrimethoxysilane, gamma-mercaptopropyltrimethoxysilane and the like.

The preferred organoalkoxysilane crosslinking agents are cellosolve silicate and those compounds in which R is aryl or alkaryl or vinyl, R' is methyl or ethyl and $n$ is 1 or 2, as illustrated by phenyltrimethoxysilane, methylphenyldimethoxysilane, vinyltrimethoxysilane, vinyltriethoxysilane, and the like. Of these crosslinking agents, Cellosolve silicate and phenyltrimethoxysilane are especially preferred. In view of the effectiveness of these crosslinking agents and particularly the preferred compounds, it was somewhat unexpected to find that certain compounds which one would anticipate to be effective crosslinkers are not effective. Thus, it has been found that the alkoxy or silanol functional polysiloxane resins which are heavily emphasized in the prior art are ineffective as crosslinking agents when blended with hydroxyfunctional polymers. For example, it was found that blending functional polysiloxanes such as Sylkyd 50 (methoxyfunctional silicone) with a hydroxyfunctional acrylic copolymer with an acid catalyst resulted in a composition having poor curing activity.

It should be observed at this time that in accordance with the definition set forth above, the crosslinking agents herein are compounds which are capable of crosslinking the hydroxyfunctional polymer at the necessary or desired curing temperature. In this regard, it will be further noted that the crosslinking agent must be sufficiently low in volatility, evaporation rate and the like to remain in the film during the crosslinking reaction. Thus, certain compounds otherwise falling within the limitations of the above structural formula may be highly volatile or have a high rate of evaporation at the required curing conditions, resulting in the escape of the compound from the coating composition before crosslinking can be attained. Such compounds are not favored in the present compositions and are readily excluded by reference to their known boiling points or by means of simple experimentation.

While the above-described organoalkoxysilane compounds are principally contemplated for use as the sole crosslinking agents in the present compositions, it may be advantageous in certain instances to employ an additional or co-crosslinking agent. Thus, in certain instances, advantageous properties may be obtained by utilizing as co-crosslinking agents a combination of the above-described organoalkoxysilane crosslinkers with a melamine-type crosslinker. When it is desired to employ such a combination, melamine resin crosslinking agents such as the well-known alkylated melamine formaldehyde resins as illustrated by hexamethoxymethylol melamine, hexakis(methoxymethyl)melamine and the like, are suitable.

The amount of organoalkoxysilane crosslinking agent employed in the compositions of this invention may range from about 10 to about 50 percent by weight, preferably 15 to about 30 percent by weight, based on the weight of the polymer solids.

The cure accelerating catalyst employed in the compositions of this invention may be an organic acid such as, for example, p-toluenesulfonic acid, n-butylphosphoric acid, and the like, or a metallic salt or an organic acid such as, for example, tin naphthenate, tin benzoate, tin octoate, tin butyrate, tin-2-ethylhexanoate, dibutyltin dioctoate, dibutyltin dilaurate, dibutyltin diacetate, iron stearate, lead octoate, and the like, or an organic amine such as, for example, isophorone diamine, methylene dianiline, imidazole and the like. The preferred cure accelerating catalysts are the organotin salts such as dibutyltin dilaurate, dibutyltin diacetate and the like.

The coating compositions of this invention may contain from about 0.1 percent by weight to about 2.0 percent by weight, preferably 0.1 percent to 1.0 percent by weight, based on the weight of interpolymer solids of the cure accelerating catalyst.

In addition to the foregoing components, the compositions of this invention may contain optional ingredients, including various pigments of the type ordinarily utilized in coatings of this general class. In addition, various fillers, plasticizers, antioxidants, flow control agents, and other such formulating additives may be employed in some instances. The compositions is ordinarily contained in a solvent which may be any solvent or solvent mixture in which the materials employed are compatible and soluble to the desired extent.

The compositions herein can be applied by any conventional method, including brushing, dipping, flow coating, etc., but they are most often applied by spraying. Conventional spray techniques and equipment are utilized. The compositions may be applied over a wide variety of substrates such as wood, metals, glass, cloth, plastics, foams and the like, as well as over primers.

The coatings are cured at elevated temperatures. In most cases, the cure schedule will range from about 30 to about 40 minutes at temperatures of from about 250° to about 400° F. However, in some cases depending upon the specific composition utilized, it is possible to cure the coating for 30 minutes at a temperature as low as 200° F.

The following examples are submitted to further illustrate the nature of the present invention and should not be considered as a limitation on the scope thereof. All parts and percentages in the examples and throughout the specification are by weight unless otherwise specified.

EXAMPLE 1

A resinous coating composition was prepared by blending the following ingredients:

| | Parts by Weight |
|---|---|
| Hydroxyfunctional acrylic polymer[1] | 100.00 |
| Cellosolve silicate[2] (crosslinker) | 10.00 |
| n-butylphosphoric acid (catalyst) | 0.50 |
| Total | 110.50 |

[1]A 50 percent solids solution of an acrylic polymer formed from a monomer mixture consisting of 10% hydroxyethyl acrylate, 2.5% methacrylic acid, 30.0% styrene, 20.0% ethylhexyl acrylate, 19.5% butyl methacrylate and 18.0% methyl methacrylate in a solvent mixture consisting of 90.0 percent xylene and 10.0% n-Butanol.
[2]85% of partially-condensed $Si(OCH_2CH_2OCH_2CH_3)_4$ and 15% of $HOCH_2CH_2OCH_2CH_3$.

The coating composition produced by blending the aboveingredients was evaluated for rate of cure by drawing down samples of the composition on glass plates and curing the samples for 30 minutes at 250° F. The cure rate of the composition was determined by measuring the level of cure attained in the film by means of a standard acetone resistance test which also serves as a measurement of the solvent resistance of the film.

The acetone resistance test is performed by rubbing the film with a cloth impregnated with acetone. The cure level and solvent resistance of the film are measured by the number of acetone rubs required to dissolve the film. In accordance with this test, a film passing from 20 to 30 acetone rubs is considered to have an acceptable cure level and fairly good solvent resistance; a film passing from 31 to 49 acetone rubs is considered to have a good cure level and good solvent resistance; and a film passing fifty or more acetone rubs is considered to have an excellent cure level and very good solvent resistance.

The composition of this example when drawn down and cured as indicated produced a smooth, continuous film which passed in excess of 40 acetone rubs.

EXAMPLES 2 AND 3

Resinous coating compositions were prepared by blending the following ingredients:

|  | Parts by Weight | |
|---|---|---|
|  | 2 | 3 |
| Hydroxyfunctional acrylic polymer as in Example 1 | 100.00 | 100.00 |
| Cellosolve silicate as in Example 1 | 10.00 | 15.00 |
| n-butylphosphoric acid | 0.25 | 0.125 |
| Total | 110.25 | 115.125 |

Samples of the above compositions were drawn down on glass plates and cured for 30 minutes at 250° F. The cure level and solvent resistance of the resultant films were measured by the acetone resistance test as described in Example 1. The coating composition of Examples 2 and 3 both passed 40+ acetone rubs, indicating a good cure level and solvent resistance.

EXAMPLES 4 THROUGH 8

Resinous coating compositions were prepared by blending the following ingredients:

|  | Parts by Weight | | | | |
|---|---|---|---|---|---|
|  | 4 | 5 | 6 | 7 | 8 |
| Hydroxyfunctional acrylic polymer of Example 1 | 100.00 | 100.00 | 100.00 | 100.00 | 100.00 |
| Phenyltrimethoxysilane (crosslinker) | 10.00 | 40.00 | 40.00 | 40.00 | 40.00 |
| n-butylphosphoric acid (catalyst) | 1.00 | — | 1.00 | — | 2.00 |
| p-toluenesulfonic acid (catalyst) | — | 1.00 | — | 2.00 | — |
| Total | 111.00 | 141.00 | 141.00 | 142.00 | 142.00 |

Duplicate samples of each of the above coating compositions were drawn down on glass plates and cured at varying times and temperatures. The cure level and solvent resistance of the resultant films were measured as in Examples 1–3. Curing conditions and test results are shown in the Table.

| Example No. | Cure Conditions | | Acetone Rubs (No.) |
|---|---|---|---|
|  | Time (Min.) | Temperature |  |
| 4 | 30 | 250° F. | 50+ |
| 4 | 30 | 350° F. | 50+ |
| 5 | 30 | 250° F. | 30 |
| 5 | 30 | 350° F. | 33 |
| 6 | 30 | 250° F. | 50+ |
| 6 | 30 | 350° F. | 50+ |
| 7 | 30 | 250° F. | 50 |
| 7 | 30 | 350° F. | 50+ |
| 8 | 30 | 250° F. | 50++ |
| 8 | 30 | 350° F. | 50++ |

EXAMPLES 9 THROUGH 14

Resinous coating compositions were prepared by blending the following ingredients:

|  | Parts by Weight | | | | | |
|---|---|---|---|---|---|---|
|  | 9 | 10 | 11 | 12 | 13 | 14 |
| Hydroxyfunctional acrylic polymer of Example 1 | 100.0 | 100.0 | 100.0 | 100.0 | 100.0 | 100.0 |
| Methylphenyldimethoxysilane | 10.00 | — | — | — | — | — |
| Diphenyldimethoxysilane | — | 10.0 | — | — | — | — |
| Phenyltrimethoxysilane | — | — | 10.0 | — | — | — |
| Mercaptopropyltriethoxysilane | — | — | — | 10.0 | — | — |
| Mercaptopropyltrimethoxysilane | — | — | — | — | 10.0 | — |
| Gamma-methacryloxypropyltrimethoxysilane | — | — | — | — | — | 10.0 |
| n-butylphosphoric acid | 0.5 | 0.5 | 0.5 | 0.5 | 0.5 | 0.5 |

Samples of each of the above coating compositions were drawn down on glass plates, cured and evaluated utilizing the acetone resistance test. Cure conditions and test results are shown in the Table:

| Example No. | Cure Conditions | | Acetone Rubs (No.) |
|---|---|---|---|
|  | Time (Min.) | Temperature |  |
| 9 | 30 | 350° F. | 46 |
| 10 | 30 | 350° F. | 59 |
| 11 | 30 | 350° F. | 60+ |
| 12 | 30 | 350° F. | 20 |
| 13 | 30 | 350° F. | 57 |
| 14 | 30 | 350° F. | 20 |

The above examples illustrate the utilization of additional alkoxysilane compounds as crosslinkers in the compositions of this invention.

EXAMPLES 15 THROUGH 19

Resinous coating compositions were prepared by blending the following ingredients:

|  | Parts by Weight | | | | |
|---|---|---|---|---|---|
|  | 15 | 16 | 17 | 18 | 19 |
| Hydroxyfunctional acrylic polymer of Example 1 | 100.0 | 100.0 | 100.0 | 100.0 | 100.0 |
| Vinyltris(2-methoxyethoxy)silane | 10.00 | — | — | — | — |
| Vinyltrimethoxysilane | — | 10.0 | — | — | — |
| Vinyltriethoxysilane | — | — | 10.0 | — | — |
| β-(3,4-epoxycyclohexyl)ethyltrimethoxysilane | — | — | — | 10.0 | — |
| Methyltrimethoxysilane | — | — | — | — | 10.0 |
| n-butylphosphoric acid | 0.5 | 0.5 | 0.5 | 0.5 | 0.5 |

Samples of the above coating compositions were drawn down on glass plates, cured and tested as in Examples 8–14. Test conditions and results are shown in the Table.

| Example No. | Cure Conditions | | Acetone Rubs (No.) |
|---|---|---|---|
|  | Time (Min.) | Temperature |  |
| 15 | 30 | 350° F. | 58 |
| 16 | 30 | 350° F. | 18* |
| 17 | 30 | 350° F. | 35 |
| 18 | 30 | 350° F. | 60+ |
| 19 | 30 | 350° F. | 30 |

*This example illustrates the effect of high volatility on the curing effectiveness of the crosslinking agents. An additional sample of the composition when cured at 250° F. for 30 minutes passed 50 acetone rubs.

EXAMPLES 20 THROUGH 22

Resinous coating compositions were prepared by blending the following ingredients:

|                         | Parts by Weight |        |        |
|-------------------------|-----------------|--------|--------|
|                         | 20              | 21     | 22     |
| Polyurethane polyol[1]  | 160.00          | 160.00 | 192.00 |
| Phenyltrimethoxysilane  | 25.00           | —      | 10.00  |
| Cellosolve silicate     | —               | 25.00  | —      |
| p-Toluenesulfonic acid  | 1.00            | 1.00   | 1.00   |
| Methyl butyl ketone     | 37.00           | 37.00  | 37.00  |
| Total                   | 223.00          | 223.00 | 240.00 |

[1] A 49.5 percent solids solution of a polyurethane polyol formed from a monomer mixture consisting of 25.8% Niax Polyol PCP0230 (a polycaprolactone diol available from Union Carbide Company), 25.8 percent 1,6-hexanediol adipate, 31.7% methane-bis(cyclohexyl isocyanate), 4.5% Ester Diol 204, 2.9% Niax Polyol 0301 (a polycaprolactone triol adduct of trimethylol propane and epsiloncaprolactone available from Union Carbide Company), 3.1% dimethylol propionic acid, 4.0% trimethylol propane, 0.4% triethylene diamine, 0.7% monoethanol amine, and 1.1% hydroxyethylenimine in a solvent mixture consisting of 54.1% methyl butyl ketone, 16.7% methyl isobutyl ketone, 21.9% isopropanol, and 7.3% butanol. The polyurethane polyol was prepared in accordance with the procedure set forth in copending application Serial No. 361,015 and has an acid number of 3.6, an OH value of 40, and a Gardner-Holdt viscosity at 25° C. of X-Z.

The above coating compositions were drawn down in 3 mil thickness on Bonderite steel panels and baked for 30 minutes at 300° F. All compositions had good solvent resistance and did not crack after being reverse impacted with 100 inch pounds thus indicating a high degree of resilience.

According to the provisions of the Patent Statutes, there are described above the invention and what are now considered to be its best embodiments. However, within the scope of the appended claims, it is to be understood that the invention can be practiced otherwise than as specifically described.

We claim:

1. A resinous coating composition comprising a blend of a hydroxyfunctional acrylic polymer with:
   (A) from about 10 percent to about 50 percent by weight of polymer solids of an organoalkoxysilane crosslinking agent selected from the group consisting of Cellosolve silicate and phenyltrimethoxysilane; and
   (B) from about 0.1 percent to about 2.0 percent by weight of polymer solids of a cure accelerating catalyst.

2. The coating composition of claim 1 wherein the hydroxyfunctional acrylic polymer is derived by copolymerizing a hydroxylcontaining monomer with at least one other monomer containing the $CH_2=C<$ group.

3. The coating composition of claim 2 wherein the hydroxylcontaining monomer is a hydroxyalkyl ester of acrylic or methacrylic acid.

4. The coating composition of claim 3 wherein the hydroxylcontaining monomer is 2-hydroxyethyl acrylate.

5. The coating composition of claim 2 wherein the hydroxyfunctional acrylic polymer contains from about 3 percent to about 30 percent by weight of polymer of hydroxyl-containing component.

6. The coating composition of claim 1 wherein the organoalkoxysilane is Cellosolve silicate.

7. The coating composition of claim 1 wherein the organoalkoxysilane is phenyltrimethoxysilane.

8. The coating composition of claim 1 wherein the cure accelerating catalyst is selected from the group consisting of organic acids, metallic salts of organic acids and organic bases.

9. The coating composition of claim 1 wherein the cure accelerating catalyst is an organic acid selected from the group consisting of n-butylphosphoric acid and p-toluenesulfonic acid.

10. The coating composition of claim 1 wherein the cure accelerating catalyst is dibutyltin dilaurate.

11. A resinous coating composition comprising a blend of a polyester polyol with:
    (A) from about 10 percent to about 50 percent by weight of polymer solids of an organoalkoxysilane crosslinking agent represented by the formula:

$$R_nSi(OR')_{4-n}$$

wherein R is an aryl, alkaryl, aralkyl, alkyl having from 1 to 8 carbon atoms, $$CH_2=C-(R_2)_m-$$
    $$\quad\quad |$$
    $$\quad\quad R_1$$

or $XR_4$—radical, wherein $R_1$ is hydrogen or an alkyl radical of 1 to 6 carbon atoms, $R_2$ is a member selected from the group consisting of alkylene radicals of 1 to 7 carbon atoms and carbonyloxy radicals represented by the formula $$-\overset{O}{\underset{\|}{C}}-O-R_3-$$

wherein $R_3$ is an alkylene radical of 1 to 6 carbon atoms and m is 0 or 1, wherein $R_4$ is an alkylene radical of 1 to 6 carbon atoms, a cycloalkylene radical, or any arylene radical, and x is a functional group selected from the group consisting of —OH, —SH,

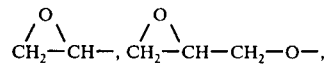

$NH_2-CH_2-CH_2-NH-$, $NH_2-$, and halogen, and wherein R' is methyl, ethyl, 2-methoxyethoxy, or 2-ethoxyethoxy and n is 0, 1 or 2; and
    (B) from about 0.1 percent to about 2.0 percent by weight of polymer solids of a cure accelerating catalyst.

12. The coating composition of claim 11 wherein said polyester polyol is derived from the reaction of a polyol component having a hydroxyl functionality of at least about 1.9 and an acid component having a carboxyl functionality of at least about 1.9.

13. The coating composition of claim 12 wherein the polyol component comprises a mixture of diols and compounds containing 3 or more hydroxy groups with no more than 25 mole percent of the mixture being compounds containing 3 or more hydroxyl groups.

14. The coating composition of claim 12 wherein the acid component is a monomeric carboxylic acid or acid anhydride having from 2 to 14 carbon atoms.

15. The coating composition of claim 11 wherein the organoalkoxysilane is Cellosolve silicate.

16. The coating composition of claim 11 wherein the organoalkoxysilane is phenyltrimethoxysilane.

17. The coating composition of claim 11 wherein the cure accelerating catalyst is selected from the group consisting of organic acids, metallic salts of organic acids and organic bases.

18. The coating composition of claim 11 wherein the cure accelerating catalyst is an organic acid selected from the group consisting of n-butylphosphoric acid and p-toluenesulfonic acid.

19. The coating composition of claim 11 wherein the cure accelerating catalyst is dibutyltin dilaurate.

20. A resinous coating composition comprising a blend of a polyurethane polyol with:
(A) from about 10 percent to about 50 percent by weight of polymer solids of an organoalkoxysilane crosslinking agent represented by the formula:

$$R_n Si(OR')_{4-n}$$

wherein R is an aryl, alkaryl, aralkyl, alkyl having from 1 to 8 carbon atoms, $$CH_2=\overset{R_1}{\underset{|}{C}}-(R_2)_m-$$

or $XR_4-$ radical, wherein $R_1$ is hydrogen or an alkyl radical of 1 to 6 carbon atoms, $R_2$ is a member selected from the group consisting of alkylene radicals of 1 to 7 carbon atoms and carbonyloxy radicals represented by the formula $$-\overset{O}{\underset{\|}{C}}-O-R_3-$$

wherein $R_3$ is an alkylene radical of 1 to 6 carbon atoms and $m$ is 0 or 1, wherein $R_4$ is an alkylene radical of 1 to 6 carbon atoms, a cycloalkylene radical, or any arylene radical, and $x$ is a functional group selected from the group consisting of —OH, —SH, $$\overset{O}{\overset{/\diagdown}{CH_2-CH-}},\ \overset{O}{\overset{/\diagdown}{CH_2-CH-CH_2-O-}},$$

$NH_2-CH_2-CH_2-NH-$, $NH_2-$, and halogen, and wherein R' is methyl, ethyl, 2-methoxyethoxy, or 2-ethoxyethoxy and n is 0, 1 or 2; and
(B) from about 0.1 percent to about 2.0 percent by weight of polymer solids of a cure accelerating catalyst.

21. The coating composition of claim 20 wherein said polyurethane polyol is the reaction product of an organic polyisocyanate and a polyol selected from the group consisting of polyether polyols, polyester polyols and mixtures thereof.

22. The coating composition of claim 20 wherein the polyurethane polyol is the ungelled reaction product of a polyurethane polyol containing at least 0.075 percent by weight of acidic carboxyl groups and an alkylenimine.

23. The coating composition of claim 12, wherein said alkylenimine has the structure:

$$R_1-\overset{R_2}{\underset{|}{C}}-(CH)_n-\overset{R_3}{\underset{|}{C}}-R_4$$
$$\diagdown\ \diagup$$
$$\underset{|}{N}$$
$$R_5$$

wherein $R_1$, $R_2$, $R_3$, $R_4$, and $R_5$ are each selected from the group consisting of hydrogen, alkyl, aryl, alkaryl and aralkyl, $R_6$ is selected from the group consisting of hydrogen and lower alkyl and $n$ is an integer from 0 to 1.

24. The coating composition of claim 23 wherein the alkylenimine is N-hydroxyethylethylenimine.

25. The coating composition of claim 1 further containing a melamine resin as a co-crosslinking agent.

26. The coating composition of claim 25 wherein said melamine resin is an alkylated melamine-formaldehyde resin.

27. A resinous coating composition comprising a blend of an ungelled reaction product of a polyurethane polyol containing at least 0.075 percent by weight of acidic carboxyl groups and an alkylenimine with:
(A) from about 10 percent to about 50 percent by weight of polymer solids of an organoalkoxysilane crosslinking agent represented by the formula:

$$R_n Si(OR')_{4-n}$$

wherein R is an aryl, alkaryl, aralkyl, alkyl having from 1 to 8 carbon atoms, $$CH_2=\overset{R_1}{\underset{|}{C}}-(R_2)_m-$$

or $XR_4-$ radical, wherein $R_1$ is hydrogen or an alkyl radical of 1 to 6 carbon atoms, $R_2$ is a member selected from the group consisting of alkylene radicals of 1 to 7 carbon atoms and carbonyloxy radicals represented by the formula $$-\overset{O}{\underset{\|}{C}}-O-R_3-$$

wherein $R_3$ is an alkylene radical of 1 to 6 carbon atoms and $m$ is 0 or 1, wherein $R_4$ is an alkylene radical of 1 to 6 carbon atoms, a cycloalkylene radical, or any arylene radical, and $x$ is a functional group selected from the groups consisting of —OH, —SH, $$\overset{O}{\overset{/\diagdown}{CH_2-CH-}},\ \overset{O}{\overset{/\diagdown}{CH_2-CH-CH_2-O-}},$$

$NH_2-CH_2-CH_2-NH-$, $NH_2-$, and halogen, and wherein R' is methyl, ethyl, 2-methoxyethoxy, or 2-ethoxyethoxy and n is 0, 1 or 2; and
(B) from about 0.1 percent to about 2.0 percent by weight of polymer solids of a cure accelerating catalyst.

28. The coating composition of claim 27 wherein the polyurethane polyol is the reaction product of an organic polyisocyanate and a polyol selected from the group consisting of polyether polyols, polyester polyols and mixtures thereof.

29. The coating composition of claim 27 wherein the alkylenimine is N-hydroxyethylethylenimine.

30. The coating composition of claim 27 wherein the organoalkoxysilane is cellosolve silicate.

31. The coating composition of claim 27 wherein the organoalkoxysilane is phenyltrimethoxysilane.

32. The coating composition of claim 27 wherein the cure accelerating catalyst is n-butylphosphoric acid.

33. The coating composition of claim 27 wherein the cure accelerating catalyst is p-toluenesulfonic acid.

34. The coating composition of claim 11 wherein said polyester polyol has a hydroxyl value of at least about 20.

35. The coating composition of claim 11 further containing a melamine resin as a co-crosslinking agent.

* * * * *

UNITED STATES PATENT AND TRADEMARK OFFICE
CERTIFICATE OF CORRECTION

PATENT NO. : 4,093,673
DATED : June 6, 1978
INVENTOR(S) : Wen-Hsuan Chang, Rostyslaw Dowbenko, Marvis E. Hartman and Samuel Porter, Jr.

It is certified that error appears in the above-identified patent and that said Letters Patent are hereby corrected as shown below:

Column 2, line 35, "proportion" should be --proportions--; line 42, "last" should be --least--.

Column 5, line 41, "n" should be --in--.

Column 6, line 46, "HN-" should be --NH- --.

Column 7, line 2, "cellosolve" should be "Cellosolve--; line 60, "or" (second occurrence) should be --of--.

Column 8, line 12, "compositions" should be --composition--; line 54, "aboveingredients" should be --above-ingredients--.

Column 11, Claim 2, line 3, "hydroxylcontaining" should be --hydroxyl-containing--; Claim 3, line 2, "hydroxylcontaining" should be --hydroxyl-containing--; Claim 4, line 2, "hydroxylcontaining" should be --hydroxyl-containing--.

Column 12, Claim 11, line 19, "x" should be --X--.

UNITED STATES PATENT AND TRADEMARK OFFICE
CERTIFICATE OF CORRECTION

PATENT NO. : 4,093,673
DATED : June 6, 1978
INVENTOR(S) : Wen-Hsuan Chang, Rostyslaw Dowbenko,
Marvis E. Hartman and Samuel Porter, Jr.

It is certified that error appears in the above–identified patent and that said Letters Patent are hereby corrected as shown below:

Column 13, Claim 20, line 19, "x" should be --X--; Claim 23, line 1, "12" should be --22--.

Column 14, Claim 27, line 21, "x" should be --X--; Claim 30, line 2, "cellosolve" should be --Cellosolve--.

Signed and Sealed this

Thirtieth Day of January 1979

[SEAL]

Attest:

RUTH C. MASON
Attesting Officer

DONALD W. BANNER
Commissioner of Patents and Trademarks